United States Patent [19]

Salminen

[11] Patent Number: 5,090,151

[45] Date of Patent: Feb. 25, 1992

[54] FISHING LURE WITH RELEASABLE HOOK

[76] Inventor: Gary Salminen, 2319 E. Laurel St., Mesa, Ariz. 85213

[21] Appl. No.: 715,627

[22] Filed: Jun. 14, 1991

[51] Int. Cl.⁵ ............................................. A01K 85/00
[52] U.S. Cl. ...............................43/42.05; 43/42.08; 43/42.36
[58] Field of Search ................. 43/42.04, 42.05, 42.08, 43/42.36

[56] References Cited

U.S. PATENT DOCUMENTS

| | | | |
|---|---|---|---|
| 1,972,697 | 9/1934 | Walsh | 43/42.05 |
| 2,036,954 | 4/1936 | Murray | 43/42.08 |
| 2,236,353 | 3/1941 | Minser | 43/42.05 |
| 2,609,633 | 9/1952 | Cracker | 43/42.36 X |
| 3,535,813 | 10/1970 | Cordell, Jr. | 43/42.05 |
| 3,914,895 | 10/1975 | Mize | 43/42.05 |
| 4,803,798 | 2/1989 | Hannah | 43/42.36 X |

Primary Examiner—Richard K. Seidel
Assistant Examiner—Patty E. Hong
Attorney, Agent, or Firm—Gregory J. Nelson

[57] ABSTRACT

A fishing lure in which the hook and body separate when a strike occurs. A body has a slot extending therethrough with a shoulder located along the slot. The hook has an elongate shank with a projection therein which normally engages the shoulder but upon a strike allows the body and hook to separate with the body sliding up the line.

In another embodiment, the lure body defines an internal slot or cavity which houses a hook frame having opposite arms which releasably engage the slot and release the body when a fish is caught. The hook frame may be a solid element or comprise opposite spring-like arms.

7 Claims, 2 Drawing Sheets

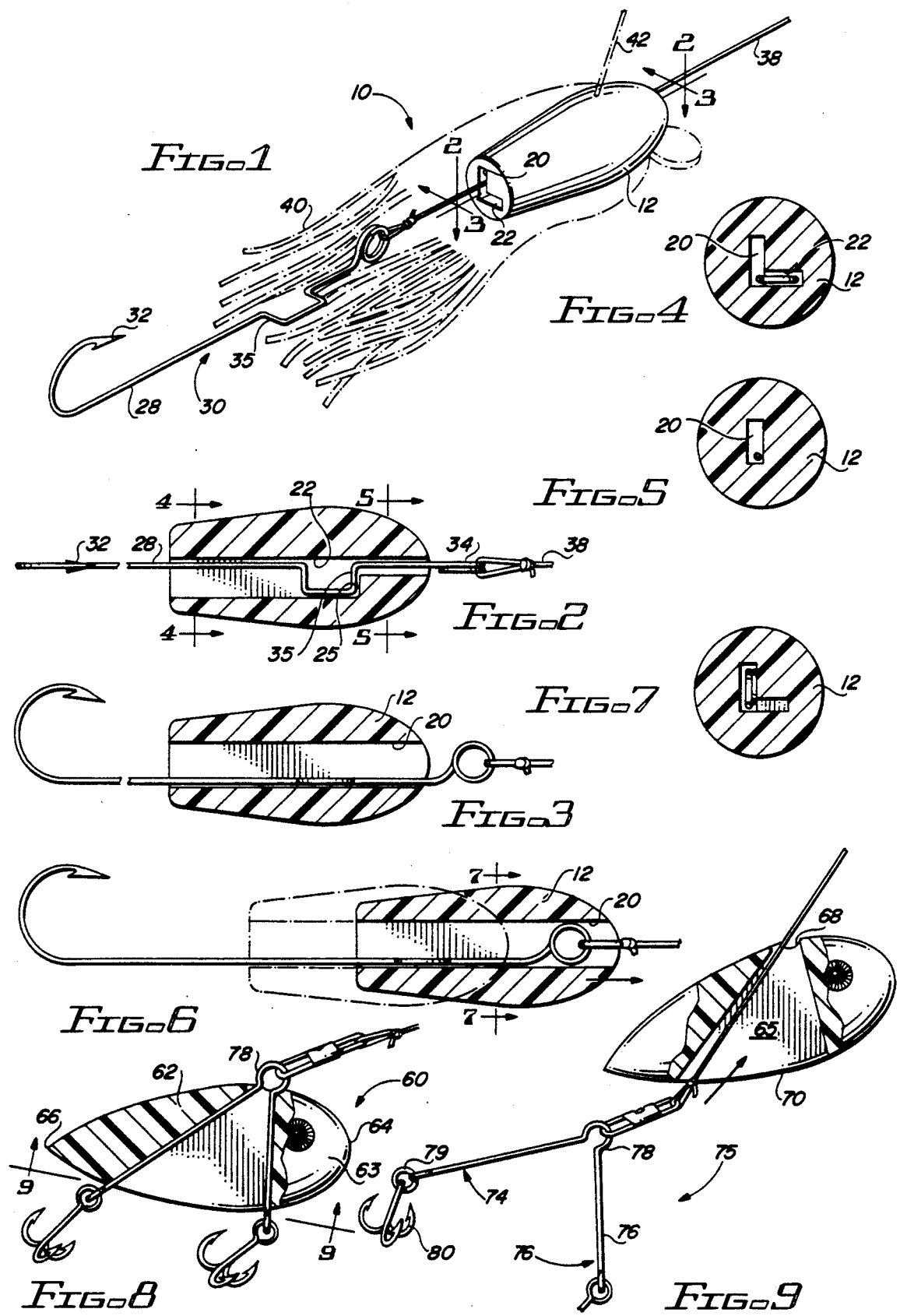

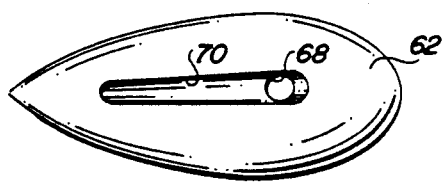
FIG.10
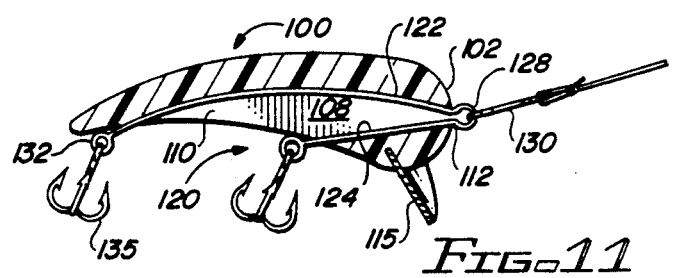
FIG.11
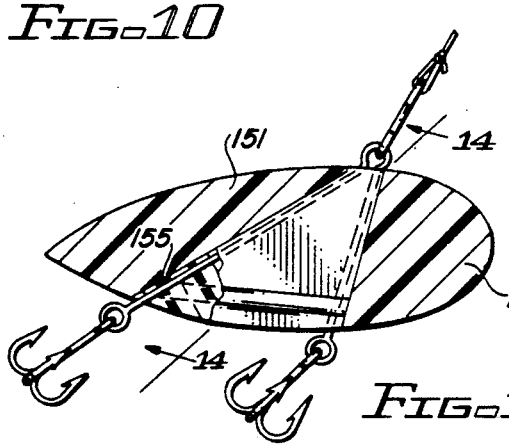
FIG.12
FIG.15
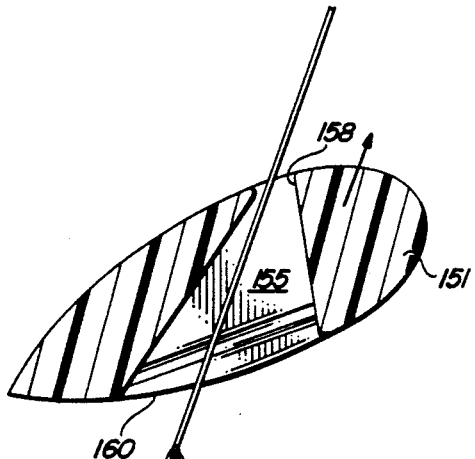
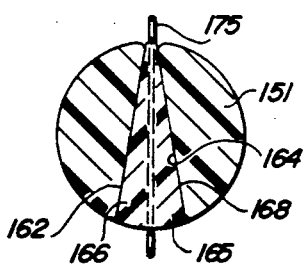
FIG.14
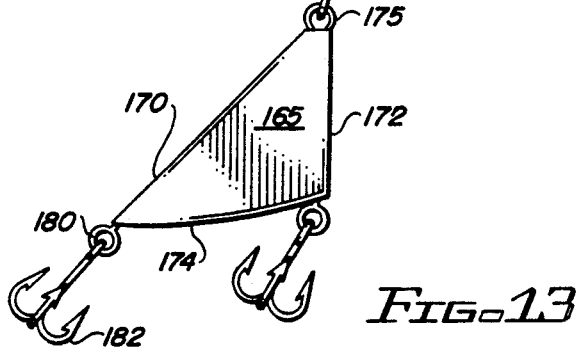
FIG.13
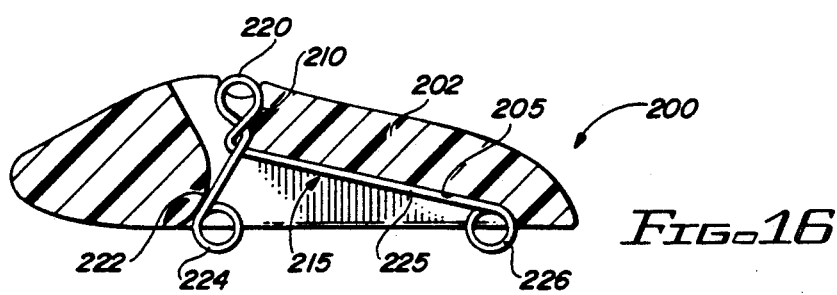
FIG.16

FISHING LURE WITH RELEASABLE HOOK

BACKGROUND OF THE INVENTION

1. Field of The Invention

The present invention relates to artificial fishing lures and more particularly to a novel lure which will allow the hook to separate from the body of the lure when a fish strikes and is caught on the hook.

There are a wide variety of artificial fishing lures used by anglers. Generally artificial lures have a body of some type which may be of various shapes and is often brightly colored and configured to simulate the appearance of a fish. A hook is attached to the body and various other accessories may be associated with the lure such as streamers, spoons and the like to attract fish and provide the desired motion through the water.

Accordingly, it is desirable to provide a lure design which enables the lure body and hook to separate when a fish is caught to eliminate the weight and drag of the lure body at the hook making it more difficult for the fish to free itself. Various patents can be found in the prior art which show fishing lures or baits having designs which allow the body of the lure to separate from the hook.

2. Summary of the Prior Art

U.S. Pat. No. 2,775,840 shows a lure in which the forward end of the hook shank is formed as a converging triangular-shaped element. The triangular-shaped element engages grooves in a conical opening at the rear of the weight or body. When a fish is hooked, the fish exerts a pull on the line to separate the weight and the hook.

U.S. Pat. No. 2,036,954 shows a wire frame which is retained within the body or weight of the lure. The hook attaches at the juncture of the two legs of the wire frame. The frame is fully collapsed within the body or weight and serves to facilitate attachment of the hook.

U.S. Pat. No. 2,112,901 discloses a fishing lure of the type in which the body becomes separated from the hook as the fish is caught. When a fish is on the line, the resulting action will cause the forwardly extending pectoral fin to pivot out of the way and the body of the lure will move forward and separate from the hook leaving the hook in the mouth of the fish.

U.S. Pat. No. 2,225,676 shows a fishing lure having a hook and leader associated with the lure with a catch and trip so that the lure and hook may be disengaged when the fish is caught. The hook and leader are secured to the body by a clamping device in the form of a locking post.

U.S. Pat. No. 2,528,861 also relates to a line that is described by the patentee as a free-hook fishing lure. A retaining clip member is molded in a recess provided within the body of the lure and has a U-shaped clip. When the fish tends to thrash about, the hook will become separated from the lure body so as to not assist the fish in becoming dislodged from the hook.

U.S. Pat. No. 1,434,204 shows an artificial bait which after the fish strikes the hook, allows the body to separate from the hook element and run up the line. The hook is frictionally engaged at a tapering plate carried by a tapering flanged plate.

U.S. Pat. No. 2,236,353 shows a fishing lure, particularly a plug, designed to relieve the plug of tension during operation of playing a hooked fish. The underside of the plug is provided with a pair of longitudinally spaced-apart spring clips which will yield under application of pressure to form a releasing connection between the plug and the hooks.

U.S. Pat. No. 2,775,840 shows a fishing lure which is provided with a sliding, weighted line stabilizer which is locked to the fish hook and rotating lure assembly when casting. The weighted line stabilizer is free to slide along the leader or the line allows the fish when hooked to carry the lure assembly away.

While the above-described and other fishing lures of the general type do permit separation of the hook from the lure body or weight, many prior art designs are either complex in design or are unreliable in operation. Accordingly, there exists a need in the field of fishing tackle for an improved lure of the type which will release the lure body or weight when a fish is hooked to allow the fish to carry the hook away from the body of the lure to eliminate the resistance of the lure body to the movement of the fish and to make it more difficult for the fish to free itself from the hook.

The purpose of a device of this type is to provide an artificial fish bait in which the lure body, after the fish strikes the hook, will separate from the hook element and run a considerable distance up the line and position itself at a location where its weight leverage and resistance to free movement in the water will not assist the fish in its attempts to tear free or release the hook element from the mouth of the fish.

BRIEF SUMMARY OF THE INVENTION

Briefly, the present invention provides a new and novel fishing lure which may be of any various type and shape such as a spinner bait, buzz bait, jig, vibrating bait, crank bait or top water bait. The lure has a body fabricated from wood, plastic or weighting material such as lead or other metal. The lure body defines a longitudinally extending slot which receives the hook assembly. The hook assembly includes a shank having an offset and terminating at a barbed hook at one end. The forward end of the shank has an eye for attachment of the line at a snap or swivel. When in use, the forward eye is positioned at the front end of the trailer or body with the offset portion of the shank engaging a shoulder along the axial slot in the body. Forward movement of the lure body in the water holds the hook assembly in place until the fish is hooked at which time the hook is released allowing the body to move up the line away from the hook assembly.

In another embodiment, the lure body defines a downwardly opening slot which extends from the top or front of the lure body to the bottom of the lure body. A hook frame is releasably engagable in the slot carrying one or more hooks which extend from the lure. An eye at the upper end of the hook frame extends through the upper opening in the body to provide a point of attachment for the fishing line.

In still another embodiment of the invention, the hook frame has two diverging arms which have spring-like characteristics to releasably engage a slot. In another embodiment, the spring frame is part of a unitary plate-like structure having a projection which serves as a detent to releasably engage the body of the lure.

BRIEF DESCRIPTION OF THE DRAWINGS

The above and other objects and advantages of the present invention will become more apparent from the following specification, claims and drawings in which:

FIG. 1 is a perspective view of a fishing line embodying the invention;

FIG. 2 is a sectional view taken along lines 2—2 of FIG. 1;

FIG. 3 is a sectional view taken along lines 3—3 of FIG. 1;

FIG. 4 is a sectional view taken along lines 4—4 of FIG. 2;

FIG. 5 is a sectional view taken along lines 5—5 of FIG. 2;

FIG. 6 is a view similar to FIG. 3 showing the lure body forwardly displaced from the hook;

FIG. 7 is a sectional view taken along lines 7—7 of FIG. 6;

FIG. 8 is a side view partly broken away of an alternate embodiment of the lure of the present invention;

FIG. 9 is a view similar to FIG. 9 showing the lure body separated from the hook;

FIG. 10 is a bottom view of the lure shown in FIGS. 8 and 9;

FIG. 11 is a side view, partly in section, of still another embodiment of the present invention;

FIG. 12 is a side view, partly in section, of another embodiment of the present invention;

FIG. 13 is a view similar to FIG. 12 showing the hook carrying frame separated from the lure body;

FIG. 14 is a sectional view taken along lines 14—14 of FIG. 12;

FIG. 15 is a sectional view similar to FIG. 14 showing an alternate cross sectional configuration for the hook frame; and FIG. 16 is a longitudinal sectional view of another embodiment of the lure of the present invention.

DETAILED DESCRIPTION OF THE INVENTION

Turning now to the drawings, FIGS. 1 to 7 show an embodiment of the present invention generally designated by the numeral 10. Embodiment 10 in these figures is an artificial fishing lure which may typically be a spinner bait, buzz bait or jig having a body 12. The body 12 may be any configuration generally conforming to the shape of small fish or other creatures which attract fish and are normally used for fishing lures. As shown for purposes of representation, the lure has the shape of a small fish having a somewhat oval-shaped body 12. A generally rectangular vertical slot 20 extends axially through the body from the front to the rear of the body and, as will be explained hereafter, is of a uniform size to permit easy passage of the hook assembly shank and eye therethrough. A laterally or generally rectangular horizontally extending slot 22 extends from the rear of the body to an intermediate location within the body. The vertical and horizontal slots intersect in a general L-configuration as best seen in FIGS. 1 and 4. The horizontally disposed slot 22 terminates at a location forming a laterally extending shoulder 25 at an intermediate location within the lure body as seen in FIG. 2.

The hook assembly 30 is best seen in FIGS. 1, 2 and 3. As seen in FIG. 3, which is a side view of the hook assembly, the hook assembly has a generally axially extending shank 28 which at the rear end is reversely bent and provided with a barbed pointed end at the distal end to form a hook 32. The forward end of the hook assembly is configured having an eye or loop 34 for attachment of fishing line, snap hook or a swivel. As seen in FIG. 2, the hook 32 of the hook assembly and the eye 34 of the hook assembly both lie in the same plane which in the assembled position is referred to as the vertical position for reference purposes.

As viewed in FIG. 2, the hook assembly is seen from the top view. It will be seen that an intermediate portion of the shank 28 of the hook assembly is provided with a generally U-shaped offset 35. As an alternative, a small blade-like projection may be secured to the axially-extending shank.

It will be seen that when the hook assembly is inserted into the lure body as seen in FIG. 2, the forward eye 34 may be passed through slot 20 assuming a position at the front of the lure. The distance from the projection 35 to the eye 34 is selected so that the eye will project at least partially from the front of the lure for attachment of the fishing line or swivel. The projection 35 engages the shoulder 25 within the lure body so that when the lure is pulled through the water, the hook assembly is held in place as seen in FIG. 2. The hook 32 of the hook assembly extends from the rear part of the lure body to engage a fish.

When a fish is hooked, that is engaged on the barbed point of the hook assembly, the hook assembly 30 and the distal section of line 38 will become disengaged from the lure body 12 allowing the lure body to effectively move upwardly along the line a distance to a position where its weight and resistance will not assist the fish in its attempt to tear free of or release the hook element from its mouth.

As indicated above, the shape and type of lure may vary and the construction may be applied to various types of bait. In addition, other appurtenances such as streamers 40, weed guards 42, spinners and other fish attracting or motion imparting devices may be associated with the lure of this design.

FIGS. 8 to 10 show another embodiment of the lure of the present invention generally designated by the numeral 60. As shown in this embodiment, the artificial lure may be of any type such as a crank bait, top water bait and the like having a body 62 which again may be of any desired configuration and is shown having a generally oval configuration generally simulating the appearance of a fish. The body 62 has a front 63 and terminates at a tail 66. As seen in FIGS. 8 and 9, the body defines a relatively narrow downwardly opening recess 65 which extends from a relatively smaller opening 68 at the top or front of the body to an elongated axially extending opening 70 at the underside of the lure body. The slot, as indicated, is relatively narrow in width and extends axially along the vertical axial center line of the body of the lure.

The hook frame assembly 75 includes two diverging arms 74 and 76, preferably of wire having spring-like characteristics. The arms are joined at a loop 78 at their upper end. The loop may be twisted to form an eye or may be in the double "R" configuration as shown in FIGS. 8 and 9. In the assembled position, the hook frame 75 is releasably receivable within the recess 65 within the body with the eye or loop 78 projecting from the top or front of the body at the opening 68. The lower or distal ends of the each of the arms of the hook frame terminate at a loop or eye to which is attached a hook 80 shown as a treble hook.

In normal use, the diverging arms 74, 76 of the hook frame 75 will engage the opposite forward and rear sides of the internal recess 65 in the lure body to frictionally retain the hooks in the position shown in FIG. 8. The normal forward motion of the lure as it moves through the water will also serve to prevent the hook frame 75 from becoming dislodged from the body of the lure. When a fish is hooked, it will normally exert a pull on the line in a direction away from the lure body 62 thereby carrying the hook frame in the direction of the pull. As seen in FIG. 9, this action will cause the hook frame 75 to move downwardly to be disengaged from the lure body and the lure body will effectively move upwardly along the attached fishing line making it more difficult for the fish to free itself from the hook.

Another embodiment of the invention is shown in FIG. 11 similar to that shown in FIGS. 8 to 10 and is designated by the numeral 100. Again, the lure has a body 102 which may be of any desired shape fabricated from a suitable material such as wood or plastic. The body defines an axially extending slot 108 intercepting the underside or belly of the lure at elongate opening 110 and converging to a smaller opening 112 which intercepts the lure at the front. A spoon or pectoral fin 115 is shown projecting forwardly to give the lure the desired action or movement in the water. In the normal position, the hook frame 120 is received and engaged within the slot 108 in the lure body. The hook frame has a pair of arms 122, 124 which are joined at their forward upper end at an eye or loop 128 to which the fishing line, leader or snap 130 can be attached. Because of the geometry of the slot, arm 124 is somewhat shorter than arm 122. The distal ends of each of the arms also terminate at an eye 132 to which a hook shown as a treble hook 135 is attached. The hook frame is constructed of a suitable material such as a wire having spring-like characteristics so that the arms may be pressed together slightly to insert the hook frame into the lure body. Once inserted, pressure on the hook frame is released and the arms will serve to frictionally engage the opposite ends of the slot 108 to secure the hook in place until such time as a fish strikes the bait and causes the hook frame and lure body to separate.

FIGS. 12 to 14 show still another embodiment of the lure or artificial bait of the present invention. This embodiment, generally designated by the numeral 150, shows a lure with a body member 151 of a suitable material such as plastic, wood or metal, defining a downwardly diverging slot 155 intersecting the upper or front portion of the lure at a relatively small opening 158 and intersecting the underside or belly portion of the lure at a larger longitudinally extending opening 160. As seen in FIG. 14, the opposite internal side walls 162, 164 of the slot 155 may also diverge slightly outwardly from their upper end to the lower end.

The hook frame 165, as best shown in FIGS. 13 and 14, has opposite side walls 166, 168. The front edge 170 and rear edge 172 of the side walls extend outwardly to a base member 174 forming a generally triangular configuration. A loop or eye 175 is provided at the apex of the frame member. The opposite ends of the base of the frame member are provided with eyes or loops 180 which receive hook members 182.

In the assembled position, the frame 165 is inserted into the slot 155 in the body with the upper eye 175 extending from the body of the lure. The frame is frictionally engaged within the body.

The lure or bait of this embodiment operates in essentially the same way as has been described above with reference to previous figures, as for example, FIGS. 8 to 10. When a fish strikes one of the hooks 182, the pull exerted by the fish will cause the frame 165 to disengage from the body. The advantage of the unitary frame is that it is easier for the user to handle, particularly the manual insertion of the frame within the body. Further, the unitary structure gives greater stability and better resistance to damage to the frame member which might result in loss of the ability of the frame to properly be frictionally engaged within the lure body.

In FIG. 15, the hook frame 180 is similar to that designated by numeral 165 shown in FIG. 14 with the modification that the opposite side walls of the frame each have a projection 185 which seats in a recess 186 in the lure body 190. The cooperating projection and recesses serve as a detent to retain the hook frame until a strike occurs.

In FIG. 16 a modified lure 200 is shown having a body 202 with a downwardly diverging axial slot 205 defined by the body. A recess 210 is formed in the top of the body and communicates with the slot. The hook frame 215 is integrally formed from a single piece of twisted wire having eye 220 which in the use-position seats in recess 210. Arm 222 terminates at loop 224 and rearwardly extending arm 225 terminates at loop 226 for attachment of a hook. A line attaches to eye 220. In use in the water, the lure functions as has been described with the advantage of a more streamlined appearance of action due to the recessed position of the loops and eye.

As indicated above, the lure of the present invention may be incorporated in lures of various shapes, designs and materials. The lure may be incorporated in spinner baits, buzz baits, jigs, vibrating baits, crank baits, top water baits or any other type of fishing lure. It will be obvious to those skilled in the art to make various changes, modifications and alterations to the form and construction of the invention disclosed herein without departing from the underlying principles disclosed. It is not therefore intended to confine the coverage of the invention to the exact form shown but it is desired to include all variations and modifications which come within the scope of the appended claims.

I claim:
1. A fishing lure comprising:
 (a) a body having a top, bottom, front and rear surfaces, said body defining an interior recess intercepting one of said top or front surfaces and extending to said bottom surface;
 (b) a hook frame releasably engageable in said recess, said hook frame having attachment means for attachment to a fishing line and opposed surfaces diverging from said attachment means and releasably engageable in said recess, said hook frame adapted for the attachment of at least one hook; and
 (c) wherein said hook frame consists of a wire member with spring-like characteristics and wherein said surfaces are formed on first and second leg members diverging from said attachment means.

2. The fishing lure of claim 1 wherein said hook frame is a substantially solid body member generally triangular-shaped including detent means associated therewith releasably engageable with said recess.

3. The fishing lure of claim 2 wherein said hook frame member has opposite sides which are generally downwardly divergent from said attachment means and wherein at least one of said sides is provided with a projection formed thereon and releasably engageable with a cooperating recess in said body member.

4. The fishing lure of claim 1 wherein said lure is selected from the group of spinner baits, buzz baits, jig baits, vibrating baits, crank baits and top water baits.

5. The fishing lure of claim 1 wherein said body is fabricated from plastic.

6. The fishing lure of claim 1 further including a weed guard associated with said lure.

7. The fishing lure of claim 1 wherein said attachment means are at least partially recessed in said lure body with said hook frame in a use-position.

* * * * *